United States Patent [19]

Turner et al.

[11] 4,011,717
[45] Mar. 15, 1977

[54] CONTROL SYSTEM FOR A GAS TURBINE

[75] Inventors: Horace George Turner, Chandler's Ford; Robert Spurgeon Wood, Gosport, both of England

[73] Assignee: Plessey Handel und Investments A.G., Zug, Switzerland

[22] Filed: Nov. 22, 1974

[21] Appl. No.: 526,163

[30] Foreign Application Priority Data

Nov. 23, 1973 United Kingdom ............ 54491/73

[52] U.S. Cl. .......................................... 60/39.28 R
[51] Int. Cl.² .......................................... F02C 9/08
[58] Field of Search ................ 60/39.28 R; 137/117

[56] References Cited
UNITED STATES PATENTS

| | | | |
|---|---|---|---|
| 2,940,394 | 6/1960 | Mosure | 60/39.28 R |
| 3,043,367 | 7/1962 | Abraham | 60/39.28 R |
| 3,514,948 | 6/1970 | Wayne | 60/39.28 R |
| 3,713,290 | 1/1973 | Gold | 60/39.28 R |
| 3,780,527 | 12/1973 | Lewis | 60/39.28 R |

*Primary Examiner*—Clarence R. Gordon
*Attorney, Agent, or Firm*—Fleit & Jacobson

[57] ABSTRACT

A control system for a gas turbine, which control system comprises a fuel pressurizing pump and two fuel flow restrictors supplied with fuel at different pressures from the pump, said restrictors being in communication with a common fuel pipe line, and there being electrically actuated means, e.g. a rotenoid, for varying the fuel pressure in the common fuel pipe line whereby said varying fuel pressure can be used for controlling the output of the gas turbine.

3 Claims, 1 Drawing Figure

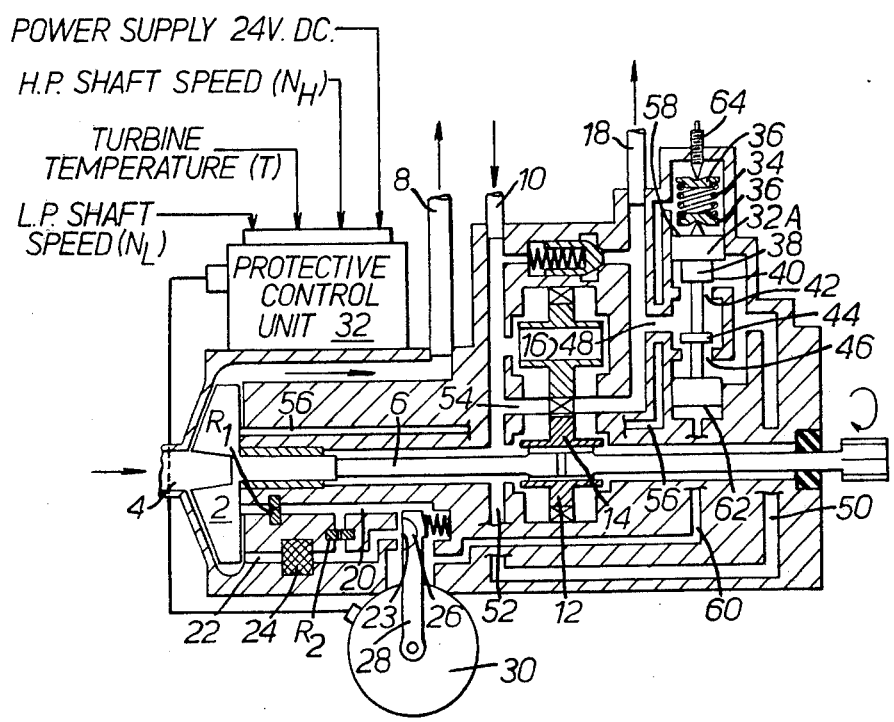

CONTROL SYSTEM FOR A GAS TURBINE

This invention relates to a control system for a gas turbine.

Gas turbine engines such as those employed in aircraft are usually equipped with hydro-mechanical control systems supplemented with electronic protection systems. A gas turbine engine can thus normally be controlled by a hydromechanical control system with the safeguard that an electronic protection system automatically prevents catastrophic failures, e.g. engine runaway or excessive engine temperatures, in the event of a malfunction of the basic hydro-mechanical control system. Now aircraft pilots and engine manufacturers prefer to have limited authority for the electronic protection system to ensure that in the event of a malfunction of the electronic protection system, engine shutdown with total loss of power does not result.

It is an aim of the present invention to provide a control system for a gas turbine with limited authority over the electronic protection system.

Accordingly, this invention provides a control system for an aircraft gas turbine engine, which control system comprises a fuel pressurising impeller which is driven as a function of the engine speed, two fuel flow restrictors which are each of a fixed size and which are supplied with fuel at different pressures from the impeller, a common fuel conduit which is in communication with said restrictors and which receives fuel at a pressure dependent upon the relative sizes of said restrictors, electrically actuated means for varying the fuel pressure in the common fuel conduit, and fuel flow control means which is operated according to the varying fuel pressure in the common fuel conduit and which is effective to control the fuel flow for the engine thereby to control the output of the engine.

This invention also provides a control system for an aircraft gas turbine engine which control system comprises a fuel pressurising impeller which acts as a backing pump for the engine and which is driven as a function of the engine speed, two fuel flow restrictors which are each of a fixed size and which are supplied with fuel at different pressures from the impeller, a common fuel conduit which is in communication with said restrictors and which receives fuel at a pressure dependent upon the relative size of said restrictors, an electrically actuated rotary solenoid for varying the fuel pressure in the common fuel conduit by controlling the size of a fuel port by-passing the common fuel conduit in response to electrical signals received from an electrically operated protective control unit for the engine, and a fuel flow control spill valve which is operated by the fuel from said fuel port and which is effective to spill fuel to control the fuel flow for the engine thereby to control the output of the engine.

Preferably, the fuel flow restrictors are of the same size.

An embodiment of the invention will now be described by way of example and with reference to the accompanying DRAWING which shows a gas turbine fuel system with a control system in accordance with the invention.

Referring to the drawing, there is shown a gas turbine fuel system in which fuel from a fuel tank enters a centrifugal backing pump 2 via a conduit 4. The backing pump 2 is driven by a shaft 6 at a speed proportional to that of the engine. The pressure of the fuel is increased during its passage through the backing pump 2 by an amount proportional to the square of the rotational speed.

The pressurised fuel is delivered from the pump 2 along a conduit 8, via an external filter (not shown) and fuel cooled oil coolers (not shown), along conduit 10 to an inlet of a high pressure gear pump 12. The gear pump 12 is also driven by the engine via the shaft 6 by means of the gears 14, 16 forming part of the pump 12. The gear pump 12 provides a further increase in the pressure of the fuel before it is delivered from the pump 12 along conduit 18 to a fuel flow regulating unit (not shown). The rate of fuel delivered by the gear pump 12 is again proportional to the rotational speed and is therefore a function of the rotational speed of the engine.

The gas turbine fuel system includes a control system having two restrictors or orifices $R_1$ and $R_2$. The two restrictors $R_1$ and $R_2$ are located behind the centrifugal backing pump 2 as shown in the drawing. The restrictors $R_1$ and $R_2$ communicate with the pump 2 through the pump impeller eye and the pump impeller tip respectively. This arrangement ensures that a small flow of fuel is maintained from $R_2$ to $R_1$ when the pump 2 is rotating, i.e. while the engine is running. The size of the restrictors $R_1$ and $R_2$ is preferably identical so that the intermediate pressure between $R_1$ and $R_2$ in the common fuel flow conduit 20 is half the difference of the pressures at the pump impeller eye and the pump impeller tip.

Fuel from the pump impeller tip passes to the restrictor $R_2$ along a conduit 22 which includes a fuel filter 24. As shown in the drawing, one branch of the conduit 22 leads to the restrictor $R_2$ and the other branch of the conduit 22 terminates in a fuel port 23. This fuel port 23 has a plurality of aperatures (not shown) which are covered by a half ball valve 26. The half ball valve 26 is incorporated in the arm 28 of a rotary solenoid 30. The port 23 thus provides an additional means of communication between the pump impeller tip and the restrictor $R_1$. It will be seen that as the half ball valve 26 is raised off its seat, there is an increase in the inter-stage pressure between the restrictors $R_1$ and $R_2$ in the common fuel conduit 20. At a given rotational speed, the increase in the inter-stage pressure is a function of the lift of the half ball valve 26.

The gas turbine fuel system also includes a protective control unit 32. Typically, the protective control unit 32 includes a 24 volt d.c. power supply. Protective control units 32 are well known per se. The protective control unit 32 senses the gas turbine engine control parameters that require protection against excessive values. In the drawing, it is assumed that the following three engine parameters are protected, although other parameters may be used depending on the engine.

$N_H$ = rotational speed of the shaft 6 which is preferably a proportion of the high pressure shaft of the engine.

T = turbine temperature.

$N_L$ = rotational speed of the turbine low pressure shaft (not shown).

The protective control unit 32 is designed so that, if any of the input parameters exceed predetermined values, an electrical signal is supplied to the rotary solenoid 30. The mangitude of this output signal is a function of the amount by which the preset limits are exceeded.

The torque generated by the rotary solenoid is a function of the magnitude of the electrical input signal received. Thus, the lift of the half ball valve 26 is a function of the over-speeding of the engine shaft or the degree of over-heating of the turbine. In other words, the lift of the half ball valve is a function of the amount by which the preset limits have been exceeded.

The gas turbine fuel system also includes a spill valve 32A which is spring loaded by means of a spring 34 positioned between abutments 36. The spill valve 32A includes a valve body 38 of the shape shown. The valve body 38 has a portion 40 for restricting the port 42 and also has a portion 44 for restricting the port 46.

The spill valve 32 enables high pressure fuel passing along the conduit 18 from the gear pump 12 to also pass along the branch conduit 48, along the conduit 50, along the conduit 52 and back into the inlet of the gear pump 12 via the conduit 54. The spill valve 32A thus enables high pressure fuel delivered by the gear pump 12 to be spilled internally back to the inlet of the gear pump 12.

As shown in the drawing, the extremities of the spill valve 32A are subjected to the fuel pressures upstream and downstream of the restrictor $R_1$. More specifically, the fuel pressure upstream of the restrictor $R_1$ passes from the pump 2 along conduit 56 to act on the surface 58 of the spill valve body 38. The fuel pressure downstream of the restrictor $R_1$ passes from the common fuel conduit 20 along conduit 60 to act on the surface 62 of the spill valve body 38. The preload of the spring 34 is set by means of an adjusting screw 64 and this spring preload is set so that when the rotary solenoid 30 is inoperative, i.e. the half ball valve 26 is shut, the spill valve 32A begins to open under the influence of the pressures at the two extremities when the gas turbine engine speed exceeds a predetermined value.

When the half ball valve 26 begins to lift, the pressure at the lower end of the spill valve increases and the spill valve commences spilling excess fuel to reduce the flow rate of the fuel to the fuel flow regulating unit via conduit 18. This prevents the engine parameters which are being monitored by the protective control unit 32 exceeding predetermined values.

It will be seen that the arrangement described above with reference to the drawing automatically limits the authority of the protective control unit 32 as the gas turbine fuel system is dependent upon adequate pressure being generated by the backing pump impeller 2. A malfunction of the protective control unit 32 cannot therefore totally shut down the gas turbine engine and failure can only result in some engine deration and a partial loss of power. Coarse overspeed protection for the engine shaft 6 is still available if the protective control unit 32 fails to operate.

It is to be appreciated that the embodiment of the invention described above with reference to the drawing has been given by way of example only and that modifications may be effected. Thus, for example, initial fuel pressure for the restrictors $R_1$ and $R_2$ has been shown as being generated by a backing pump impeller 2. If desired, a further impeller could be introduced into the system which would have the sole purpose of providing the fuel pressure to the restrictors $R_1$ and $R_2$. Also, the rotary solenoid 30 could be replaced by a linear solenoid in some cases.

The fuel flow regulating unit has not been shown and described in detail since this is a known item per se. Preferably, this fuel flow regulating unit will include an altitude compensator and a condition level operating a rotary plate fuel throttle and shut-off cock.

The system of the present invention may be provided as a compact unit with a minimum of external piping to reduce weight and the risk of inadvertent damage.

What we claim is:

1. A control system for an aircraft gas turbine engine, which control system comprises a fuel pressurising impeller which is driven as a function of the engine speed, two fuel flow restrictors which are each of a fixed size and which are supplied with fuel at different pressures from the impeller, a common fuel conduit which is in communication with said restrictors and which receives fuel at a pressure dependent upon the relative sizes of said restrictors, electrically actuated means for varying the fuel pressure in the common fuel conduit, and fuel flow control means which is operated according to the varying fuel pressure in the common fuel conduit and which is effective to control the fuel flow for the engine thereby to control the output of the engine.

2. A control system for an aircraft gas turbine engine, which control system comprises a fuel pressurising impeller which acts as a backing pump for the engine and which is driven as a function of the engine speed, two fuel flow restrictors which are each of a fixed size and which are supplied with fuel at different pressures from the impeller, a common fuel conduit which is in communication with said restrictors and which receives fuel at a pressure dependent upon the relative sizes of said restrictors, an electrically actuated rotary solenoid for varying the fuel pressure in the common fuel conduit by controlling the size of a fuel port by-passing the common fuel conduit in response to electrical signals received from an electrically operated protective control unit for the engine, and a fuel flow spill valve which is operated by the fuel from said fuel port and which is effective to spill fuel to control the fuel flow for the engine thereby to control the output of the engine.

3. A control system according to claim 2 in which the fuel flow restrictors are of the same size.

* * * * *